(12) United States Patent
Nakata et al.

(10) Patent No.: US 11,469,443 B2
(45) Date of Patent: Oct. 11, 2022

(54) ELECTRICITY STORAGE ELEMENT INCLUDING STACKED METAL FOILS JOINED TO LEAD BY SECOND JOINT WITHIN FIRST JOINT, METHOD OF MANUFACTURING ELECTRICITY STORAGE ELEMENT, JOINING METHOD, AND JOINT ASSEMBLY

(71) Applicant: SANYO Electric Co., Ltd., Daito (JP)

(72) Inventors: Naofumi Nakata, Hyogo (JP); Ryoichi Wakimoto, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 208 days.

(21) Appl. No.: 16/735,958

(22) Filed: Jan. 7, 2020

(65) Prior Publication Data

US 2020/0259204 A1 Aug. 13, 2020

(30) Foreign Application Priority Data

Feb. 8, 2019 (JP) .............................. JP2019-021794

(51) Int. Cl.
*H01M 10/04* (2006.01)

(52) U.S. Cl.
CPC ..... *H01M 10/0468* (2013.01); *H01M 10/049* (2013.01)

(58) Field of Classification Search
CPC .................. H01M 10/0468; H01M 10/049
USPC ................................................ 429/209, 233
See application file for complete search history.

(56) References Cited

U.S. PATENT DOCUMENTS

2013/0052531 A1* 2/2013 Yoshitake .............. H01G 11/76
429/211

FOREIGN PATENT DOCUMENTS

| JP | 2012-209261 A | | 10/2012 | | |
|---|---|---|---|---|---|
| JP | 2014212012 A | * | 11/2014 | | |
| WO | WO-2017057200 A1 | * | 4/2017 | ............. | H01G 11/76 |

* cited by examiner

*Primary Examiner* — Sean P Cullen
(74) *Attorney, Agent, or Firm* — WHDA, LLP

(57) ABSTRACT

A method includes a step A of ultrasonic-joining stacked metal foils to each other and a step B of ultrasonic-joining all of the joined metal foils and a metal plate to each other after the step A. The step A is performed by transmitting ultrasonic vibrations to a horn with the stacked metal foils being interposed between the horn and an anvil and pressed. The step A includes a first joining step of solid-state-joining at least some metal foils of the stacked metal foils that are located near the horn to each other, and a second joining step of solid-state-joining all of the stacked metal foils to each other after the first joining step. The second joining step is performed within a joined region that is joined at the first joining step.

2 Claims, 8 Drawing Sheets

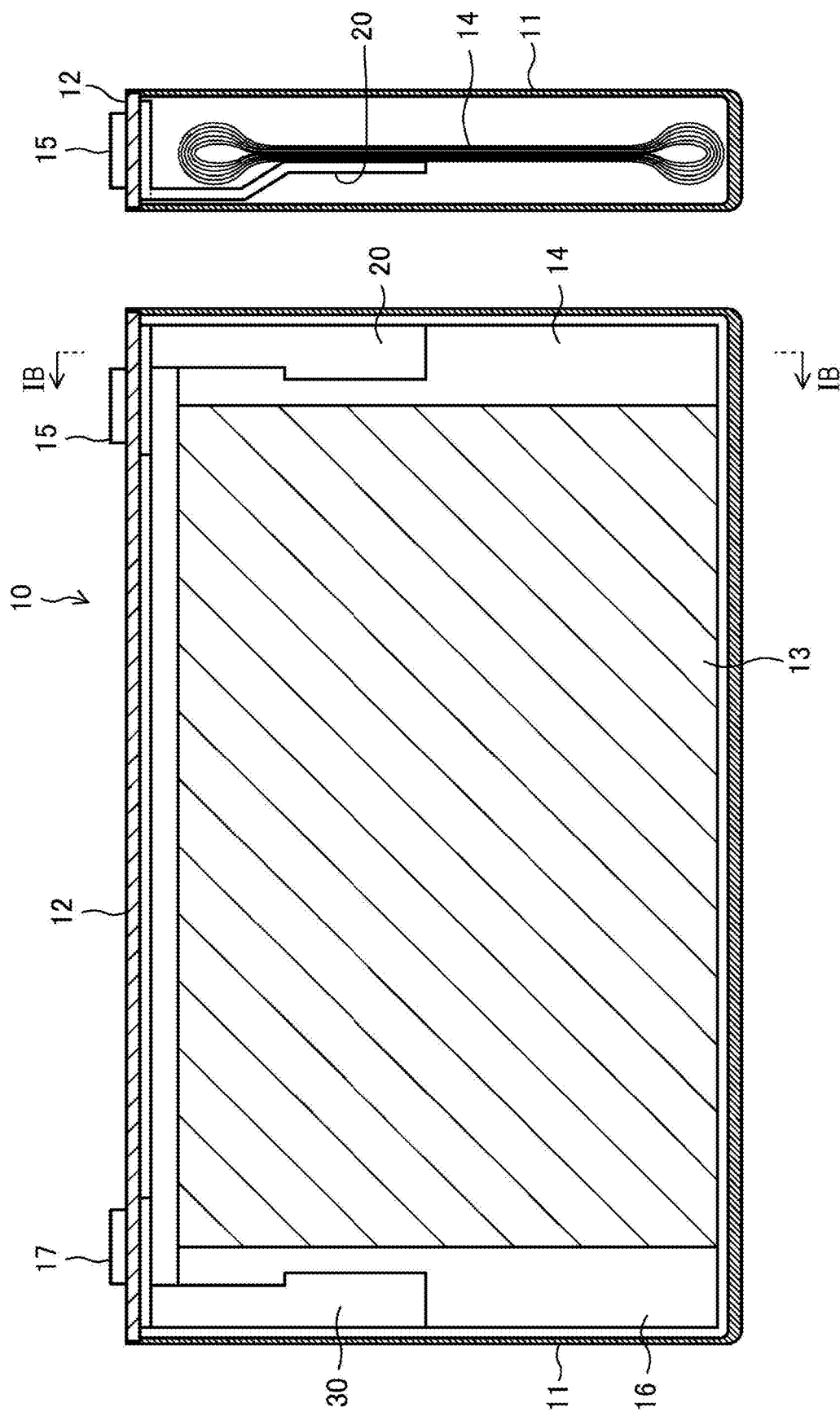

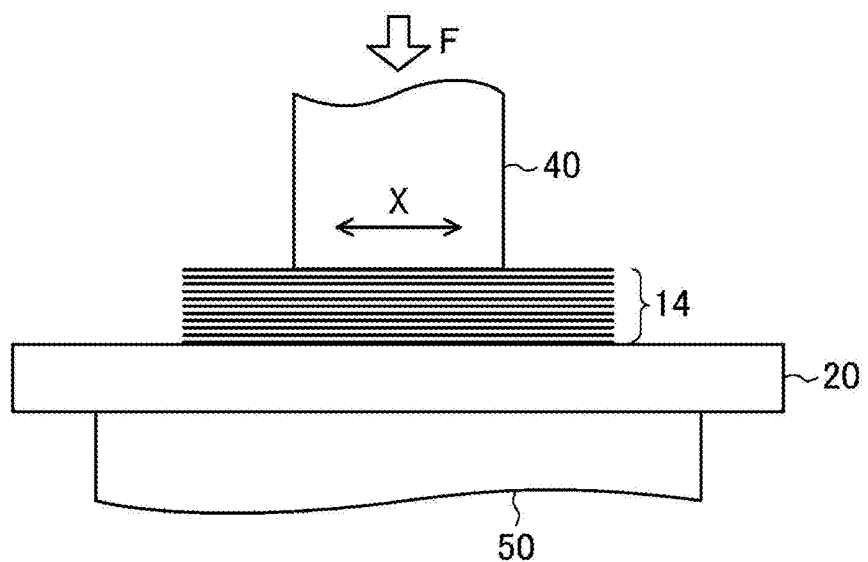
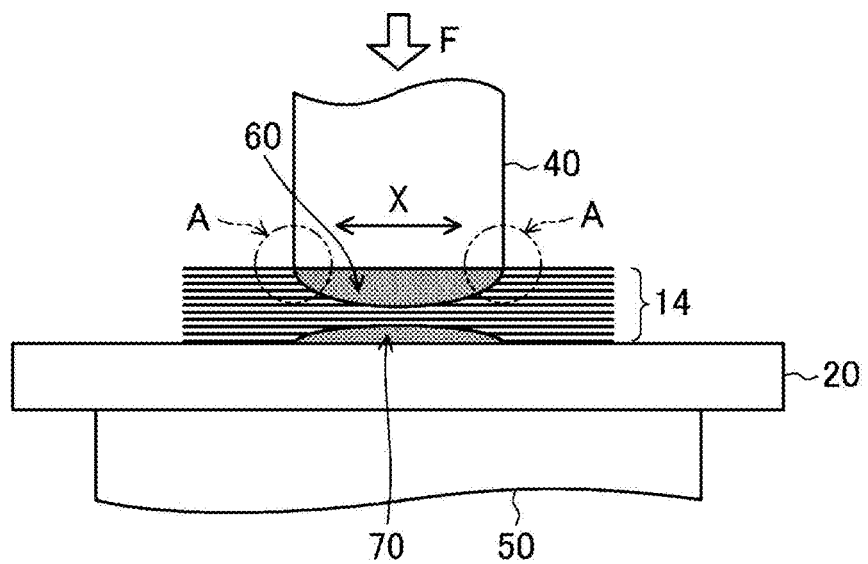

ELECTRICITY STORAGE ELEMENT INCLUDING STACKED METAL FOILS JOINED TO LEAD BY SECOND JOINT WITHIN FIRST JOINT, METHOD OF MANUFACTURING ELECTRICITY STORAGE ELEMENT, JOINING METHOD, AND JOINT ASSEMBLY

CROSS REFERENCE TO RELATED APPLICATIONS

The present invention application claims priority to Japanese Patent Application No. 2019-021794 filed in the Japan Patent Office on Feb. 8, 2019, the entire contents of which are incorporated herein by reference.

BACKGROUND OF THE INVENTION

Field of the Invention

The present invention relates to a method of manufacturing an electricity storage element including a tab that is composed of stacked metal foils extending from an electrode body and that is connected to an external terminal with a lead interposed therebetween, and an electricity storage device. The present invention also relates to a method of joining the stacked metal foils, and a joint assembly.

Description of Related Art

In a secondary battery such as a lithium-ion secondary battery, a positive-electrode sheet and a negative-electrode sheet are wound or stacked with a separator interposed therebetween to form an electrode body, and the electrode body is contained in a battery case together with an electrolyte.

Tabs each of which is composed of metal foils extend from the positive-electrode sheet and the negative-electrode sheet that form the electrode body, and the multilayered tabs are connected to respective external terminals that are disposed on a sealing plate of the battery case with corresponding leads each of which is composed of a metal plate interposed therebetween.

A known method of joining stacked metal foils (tab) and a lead is ultrasonic joining. Ultrasonic joining is performed in a manner in which ultrasonic vibrational energy is given to joint surfaces with the stacked metal foils and the lead being interposed between a horn and an anvil under an appropriate pressure. Projections (projecting portions) are typically formed on a surface of the horn and a surface of the anvil to hold the stacked metal foils and the lead therebetween with certainty.

In some cases, however, a metal foil for use in, for example, a lithium-ion secondary battery is very thin, and the metal foil in contact with the horn is damaged, for example, broken during ultrasonic joining.

If the broken metal foil enters the battery while the battery is assembled, there is a possibility that the quality of the battery is reduced.

To solve the problem, Japanese Published Unexamined Patent Application No. 2012-209261 (Patent Document 1) discloses a method of ultrasonic-joining stacked metal foils and a lead to each other by transmitting ultrasonic vibrations to a horn with a metal plate being interposed between the horn and the metal foils.

BRIEF SUMMARY OF THE INVENTION

However, the method disclosed in Patent Document 1 has a problem in that it is necessary to provide the additional metal plate that is not conducive to battery reaction, and that the energy density of the battery decreases.

The present invention has been accomplished in view of the circumstances, and it is a primary object of the present invention to provide a joining method and a joint assembly that enable metal foils to be inhibited from being damaged when the metal foils stacked and a lead are ultrasonic-joined to each other.

A method of manufacturing an electricity storage element according to the present invention is a method of manufacturing an electricity storage element including a tab that is composed of stacked metal foils extending from an electrode body and that is connected to an external terminal with a lead interposed therebetween. The method includes a step A of preparing the electrode body, and a step B of ultrasonic-joining the stacked metal foils and the lead to each other. The step B is performed by transmitting an ultrasonic vibration to a horn with the stacked metal foils and the lead being interposed between the born and an anvil and pressed. The step B includes a first joining step of solid-state-joining at least some metal foils of the stacked metal foils that are located near the horn to each other, and a second joining step of solid-state-joining all of the stacked metal foils and the lead to each other after the first joining step. The second joining step is performed within a joined region that is joined at the first joining step.

Another method of manufacturing an electricity storage element according to the present invention is a method of manufacturing an electricity storage element including a tab that is composed of stacked metal foils extending from an electrode body and that is connected to an external terminal with a lead interposed therebetween. The method includes a step A of preparing the electrode body, a step B of ultrasonic-joining the stacked metal foils to each other, and a step C of ultrasonic-joining all of the joined metal foils and the lead to each other after the step B. The step B is performed by transmitting an ultrasonic vibration to a horn with the stacked metal foils being interposed between the horn and an anvil and pressed. The step B includes a first joining step of solid-state-joining at least some metal foils of the stacked metal foils that are located near the horn to each other, and a second joining step of solid-state-joining all of the stacked metal foils to each other after the first joining step. The second joining step is performed within a joined region that is joined at the first joining step.

An electricity storage element according to the present invention includes a tab that is composed of stacked metal foils extending from an electrode body and that is connected to an external terminal with a lead interposed therebetween. The stacked metal foils and the lead are solid-state-joined to each other to form an ultrasonic-joined portion. The ultrasonic-joined portion includes a first joint that is formed by solid-state-joining at least some metal foils of the stacked metal foils to each other, and a second joint that is formed by solid-state-joining all of the stacked metal foils and the lead to each other. The second joint is located within the first joint.

A method of joining metal foils to each other according to the present invention is a method of joining stacked metal foils to each other. The method includes joining the stacked metal foils to each other by ultrasonic joining in a manner in which an ultrasonic vibration is transmitted to a horn with the stacked metal foils being interposed between the horn and an anvil and pressed. The ultrasonic joining includes a first joining step of solid-state-joining at least some metal foils of the stacked metal foils that are located near the horn to each other, and a second joining step of solid-state-joining all of the stacked metal foils to each other after the first joining step. The second joining step is performed within a joined region that is joined at the first joining step.

A metal foil joint assembly according to the present invention is a metal foil joint assembly formed by solid-state-joining stacked metal foils to each other by ultrasonic joining. The metal foil joint assembly includes a first joint that is formed by solid-state-joining at least some metal foils of the stacked metal foils to each other, and a second joint that is formed by solid-state-joining all of the stacked metal foils to each other. The second joint is located within the first joint.

A joining method according to the present invention is a method of joining stacked metal foils and a metal plate to each other. The method includes a step A of ultrasonic-joining the stacked metal foils to each other, and a step B of ultrasonic-joining all of the joined metal foils and the metal plate to each other after the step A. The step A is performed by transmitting an ultrasonic vibration to a horn with the stacked metal foils being interposed between the horn and an anvil and pressed. The step A includes a first joining step of solid-state-joining at least some metal foils of the stacked metal foils that are located near the horn to each other, and a second joining step of solid-state-joining all of the stacked metal foils to each other after the first joining step. The second joining step is performed within a joined region that is joined at the first joining step.

The present invention provides a joining method and a joint assembly that enable metal foils to be inhibited from being damaged when the metal foils stacked and a lead are ultrasonic-joined to each other.

BRIEF DESCRIPTION OF THE SEVERAL VIEWS OF THE DRAWINGS

FIG. 1A is a schematic, sectional view of the structure of a secondary battery according to an embodiment of the present invention.

FIG. 1B is a schematic, sectional view of the structure of the secondary battery taken along line IB-IB in FIG. 1A.

FIG. 2 illustrates a typical process of joining stacked positive-electrode metal foils and a positive-electrode lead to each other by ultrasonic joining.

FIG. 3 illustrates the typical process of joining the stacked positive-electrode metal foils and the positive-electrode lead to each other by ultrasonic joining.

DETAILED DESCRIPTION OF THE INVENTION

Figure 4A:
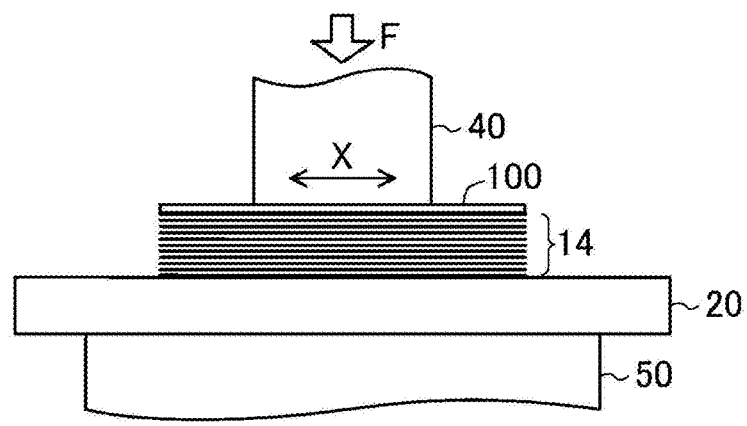
FIG. 4A to FIG. 4C illustrate an ultrasonic-joining method disclosed in Patent Document 1.

An embodiment of the present invention will hereinafter be described in detail with reference to the drawings. The present invention is not limited to the embodiment below. The present invention can be appropriately modified without departing from the range in which the effects of the present invention are achieved.

FIG. 1A is a schematic, sectional view of the structure of a secondary battery according to the embodiment of the present invention. FIG. 1B is a schematic, sectional view of the structure of the secondary battery taken along line IB-IB in FIG. 1A.

As illustrated in FIG. 1A and FIG. 1B, a secondary battery 10 according to the present embodiment includes an electrode body 13 that serves as a power generation component and that is contained in a battery case 11 together with an electrolyte. An opening of the battery case 11 is sealed by a sealing plate 12. A positive-electrode external terminal 15 and a negative-electrode external terminal 17 extend through through-holes that are formed in the sealing plate 12 and are secured to the sealing plate 12.

A positive-electrode sheet and a negative-electrode sheet are wound with a separator (these are not illustrated) interposed therebetween to form the electrode body 13. A positive-electrode metal foil that has a positive electrode active material layer formed as a surface layer may be used for the positive-electrode sheet. A negative electrode metal foil that has a negative electrode active material layer formed as a surface layer may be used for the negative-electrode sheet.

Positive-electrode metal foils 14 on which there is no active material layer are exposed along an end portion of the positive-electrode sheet, and negative-electrode metal foils 16 on which there is no active material layer are exposed along an end portion of the negative-electrode sheet. At an end portion of the electrode body 13, the exposed positive-electrode metal foils 14 (positive-electrode tab) are wound such that the positive-electrode metal foils 14 are stacked. Similarly, at another end portion of the electrode body 13, the exposed negative-electrode metal foils 16 (negative-electrode tab) are wound such that the negative-electrode metal foils 16 are stacked. The positive-electrode metal foils (positive-electrode tab) 14 are connected to the positive-electrode external terminal 15 with a positive-electrode lead 20 interposed therebetween. The negative electrode metal foils (negative-electrode tab) 16 are connected to the negative-electrode external terminal 17 with a negative electrode lead 30 interposed therebetween.

As illustrated in FIG. 1B, the stacked positive-electrode metal foils (positive-electrode tab) 14 along the end portion of the positive-electrode sheet are bundled and joined to the positive-electrode lead 20 by ultrasonic joining. Similarly, the stacked negative electrode metal foils (negative-electrode tab) 16 along the end portion of the negative-electrode sheet are bundled and joined to the negative electrode lead 30 by ultrasonic joining.

In the case where the secondary battery 10 is a non-aqueous electrolyte secondary battery, the positive-electrode metal foils 14, the positive-electrode lead 20, and the positive-electrode external terminal 15 are preferably composed of aluminum or an aluminum alloy. The negative-electrode metal foils 16, the negative electrode lead 30, and the negative-electrode external terminal 17 are preferably composed of copper or a copper alloy.

FIG. 2 and FIG. 3 each illustrate a typical process of joining the stacked positive-electrode metal foils 14 and the positive-electrode lead 20 to each other by ultrasonic joining. A process of joining the stacked negative-electrode metal foils 16 and the negative electrode lead 30 to each other by ultrasonic joining can be performed in the same manner.

As illustrated in FIG. 2, ultrasonic joining is performed in a manner in which the stacked positive-electrode metal foils 14 and the positive-electrode lead 20 are interposed between a horn 40 and an anvil 50, ultrasonic vibrations are transmitted to the horn 40 in a direction X parallel to flat surfaces of the positive-electrode metal foils 14 with the horn 40 pressed with a pressing force F in the direction of an arrow. To increase the degree of grip of the positive-electrode metal foils 14, a projection (projecting portion) may be formed on a surface of the horn 40. To increase the degree of grip of the positive-electrode lead 20, a projection (projecting portion) may be formed on a surface of the anvil 50.

As illustrated in FIG. 3, when the ultrasonic vibrations are transmitted to the horn 40, vibrational energy is given to the outermost positive-electrode metal foil 14 that is gripped by the horn 40 in tune with the horn 40. This produces a frictional force between the outermost positive-electrode metal foil 14 and the positive-electrode metal foil 14 located right below, an oxide film and a stain at a joint interface are removed, and the positive-electrode metal foils 14 are solid-state-joined to each other. The vibrational energy is successively transmitted to the lower positive-electrode metal foils 14, and a solid-state joint 60 is formed through the positive-electrode metal foils 14.

The vibrational energy is transmitted also to the positive-electrode metal foils 14 near the positive-electrode lead 20. Accordingly, a frictional force is produced also between the positive-electrode lead 20 that is gripped by the anvil 50 and the positive-electrode metal foil 14 in contact with the positive-electrode lead 20. Consequently, as illustrated in FIG. 3, a solid-state joint 70 is formed through the positive-electrode metal foils 14 starting from the positive-electrode metal foil 14 in contact with the positive-electrode lead 20.

The solid-state joints 60 and 70 thus spread in the vertical direction. Accordingly, all of the positive-electrode metal foils 14 and the positive-electrode lead 20 are finally solid-state-joined to each other.

However, when a strong pressing force and high vibrational energy are transmitted from the horn 40 to the positive-electrode metal foils 14 that are thin, the positive-electrode metal foils 14 that have weak strength are partly broken in some cases. In particular, as illustrated in FIG. 3, a stress is likely to concentrate on a portion (illustrated by an arrow A) of the positive-electrode metal foil 14 in contact with a circumferential portion of the horn 40, and the portion of the positive-electrode metal foil 14 is likely to be broken.

Figure 4B:
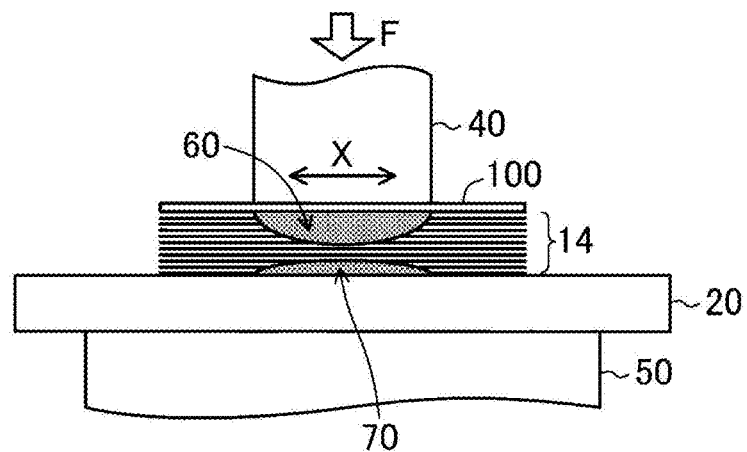
Figure 4C:
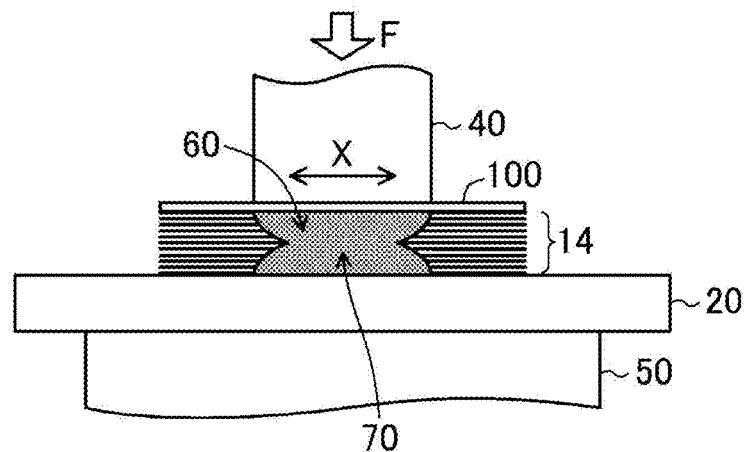

FIG. 4A to FIG. 4C illustrate an ultrasonic-joining method disclosed in Patent Document 1.

As illustrated in FIG. 4A, the ultrasonic-joining method disclosed in Patent Document 1 includes transmitting a pressing force and ultrasonic vibrations to the horn 40 with a metal plate 100 interposed between the stacked positive-electrode metal foils 14 and the horn 40 to ultrasonic-join the stacked positive-electrode metal foils 14 and the positive-electrode lead 20 to each other.

As illustrated in FIG. 4B, when the ultrasonic vibrations are transmitted to the horn 40, vibrational energy is given to the metal plate 100 that is gripped by the horn 40 in tune with the horn 40. This produces a frictional force between the metal plate 100 and the outermost positive-electrode metal foil 14, and the metal plate 100 and the outermost positive-electrode metal foil 14 are solid-state-joined to each other.

At this time, the outermost positive-electrode metal foil 14 is connected to the horn 40 with the metal plate 100 interposed therebetween, and a stress can be prevented from concentrating on a circumferential portion of the horn 40. Consequently, the outermost positive-electrode metal foil 14 is not broken, and the metal plate 100 and the outermost positive-electrode metal foil 14 are solid-state-joined to each other. The vibrational energy is successively transmitted to the lower positive-electrode metal foils 14, and the solid-state joint 60 is formed through the positive-electrode metal foils 14. Consequently, as illustrated in FIG. 4C, the solid-state joints 60 and 70 spread in the vertical direction, and all of the positive-electrode metal foils 14 and the positive-electrode lead are solid-state-joined to each other, and the positive-electrode metal foils 14 are not broken.

However, the ultrasonic-joining method disclosed in Patent Document 1 has the problem in that it is necessary to provide the additional metal plate that is not conducive to battery reaction, and that the energy density of the battery decreases as described above.

FIG. 5A to FIG. 5C and FIG. 6A to FIG. 6C illustrate a method of joining the stacked positive-electrode metal foils (positive-electrode tab) 14 that extend from the electrode body and the positive-electrode lead 20 to each other by ultrasonic joining according to the present embodiment. A method of joining the stacked negative electrode metal foils (negative-electrode tab) 16 and the negative electrode lead 30 to each other by ultrasonic joining is performed in the same manner, and a description thereof is omitted.

Figure 5A:
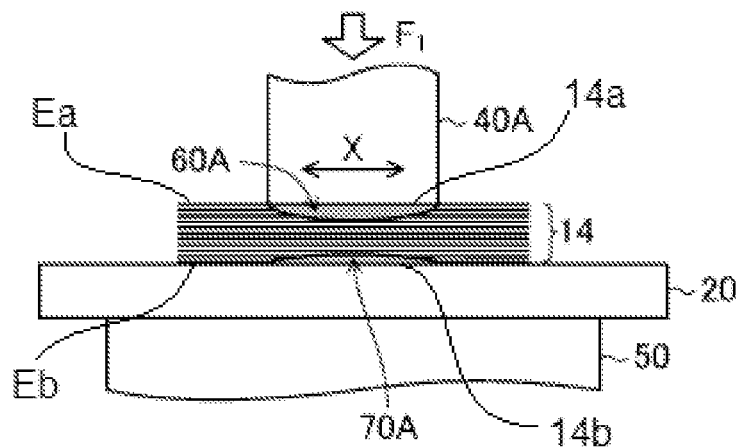
FIG. 5A to FIG. 5C illustrate a method of joining the stacked positive-electrode metal foils that extend from an electrode body and the positive-electrode lead to each other by ultrasonic joining according to the embodiment of the present invention.

As illustrated in FIG. 5A, ultrasonic joining is performed in a manner in which the stacked positive-electrode metal foils 14 and the positive-electrode lead 20 are interposed between a first horn 40A and the anvil 50, ultrasonic vibrations are transmitted to the first horn 40A in the direction X parallel to the flat surfaces of the positive-electrode metal foils 14 with the first horn 40A pressed with a pressing force F in the direction of an arrow. To increase the degree of grip of the positive-electrode metal foils 14, a projection (projecting portion) may be formed on a surface of the first horn 40A. To increase the degree of grip of the positive-electrode lead 20, a projection (projecting portion) may be formed on a surface of the anvil 50.

When the ultrasonic vibrations are transmitted to the first horn 40A, vibrational energy is given to the outermost positive-electrode metal foil 14 that is gripped by the first horn 40A in tune with the first horn 40A. This produces a fictional force between the outermost positive-electrode metal foil 14 and the positive-electrode metal foil 14 located right below, an oxide film and a stain at the joint interface are removed, and the positive-electrode metal foils 14 are solid-state-joined to each other. The vibrational energy is successively transmitted to the lower positive-electrode metal foils 14, and at least some of the positive-electrode metal foils 14 located near the first horn 40A are solid-state-joined to each other (first joining step). Consequently, a solid-state joint including a first-side first joint, hereinafter also referred to as "first joint 60A," extending from a first surface 14a at a first end Ea in a stacking direction of the positive-electrode metal foils 14, the first surface 14a being free of direct contact with the positive-electrode lead 20, is formed through the positive-electrode metal foils 14.

The vibrational energy is transmitted also to the positive-electrode metal foils 14 near the positive-electrode lead 20. Accordingly, a frictional force is produced also between the positive-electrode lead 20 that is gripped by the anvil 50 and the positive-electrode metal foil 14 in contact with the positive-electrode lead 20. Consequently, as illustrated in FIG. 5A, a solid-state joint including a second-side first joint, hereinafter also referred to as "joint 70A," extending from a second surface 14*b* at a second end Eb, opposite the first end Ea, in the stacking direction of the positive-electrode metal foils 14, the second surface 14*b* being in direct contact with the positive-electrode lead 20, is formed through the positive-electrode metal foils 14 starting from the positive-electrode metal foil 14 in contact with the positive-electrode lead 20.

According to the present embodiment, at the first joining step, ultrasonic joining is performed in conditions in which the outermost positive-electrode metal foil 14 in contact with the first horn 40A is not broken. Specifically, the energy (frequency and/or amplitude) of the ultrasonic vibrations that are transmitted to the first horn 40A per unit area is set such that the positive-electrode metal foil 14 is not broken. The energy per unit area has a value obtained by dividing the energy of the ultrasonic vibrations that are transmitted to the first horn 40A by the area of the surface of the first horn 40A.

As the conditions of ultrasonic-joining performed at the first joining step, the pressing force that is transmitted to the first horn 40A per unit area may be set such that the positive-electrode metal foil 14 is not broken. The pressing force per unit area has a value obtained by dividing the pressing force $F_1$ that is transmitted to the first horn 40A by the area of the surface of the first horn 40A.

Figure 5B:
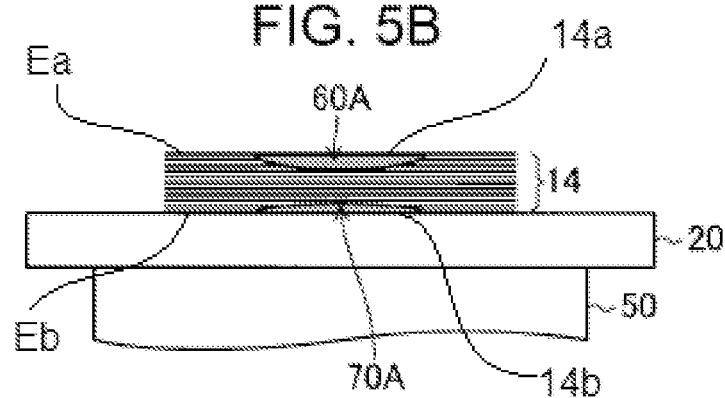

FIG. 5B illustrates a state in which the first horn 40A is removed after the first joining step. As illustrated in FIG. 5B, near a position from which the first horn 40A is removed, some of the positive-electrode metal foils 14 are solid-state-joined to each other to form the first joint 60A. The first joint 60A has a thickness equal to the total thickness of the some of the positive-electrode metal foils 14 and increases in strength.

Figure 5C:
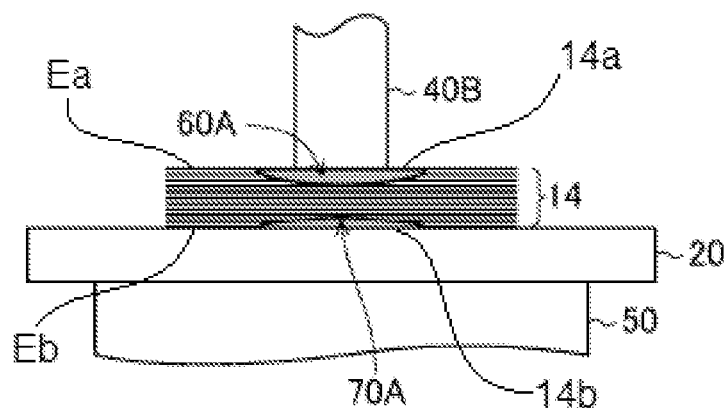

Subsequently, as illustrated in FIG. 5C, the stacked positive-electrode metal foils 14 and the positive-electrode lead 20 are interposed between a second horn 40B and the anvil 50. The second horn 40B has a width less than the width of the first horn 40A and is disposed within the first joint 60A that is formed at the first joining step.

Figure 6A:
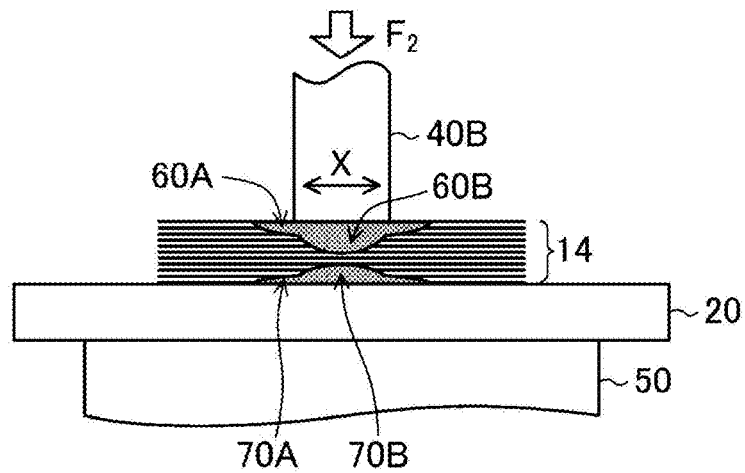
FIG. 6A to FIG. 6C illustrate the method of joining the stacked positive-electrode metal foils that extend from the electrode body and the positive-electrode lead to each other by ultrasonic joining according to the embodiment of the present invention.

Subsequently, as illustrated in FIG. 6A, ultrasonic vibrations are transmitted to the second horn 40B in the direction X parallel to the flat surfaces of the positive-electrode metal foils 14 with the second horn 40B pressed with a pressing force $F_2$ in the direction of an arrow. To increase the degree of grip of the positive-electrode metal foils 14, a projection (projecting portion) may be formed on a surface of the second horn 40B.

Figure 6B:
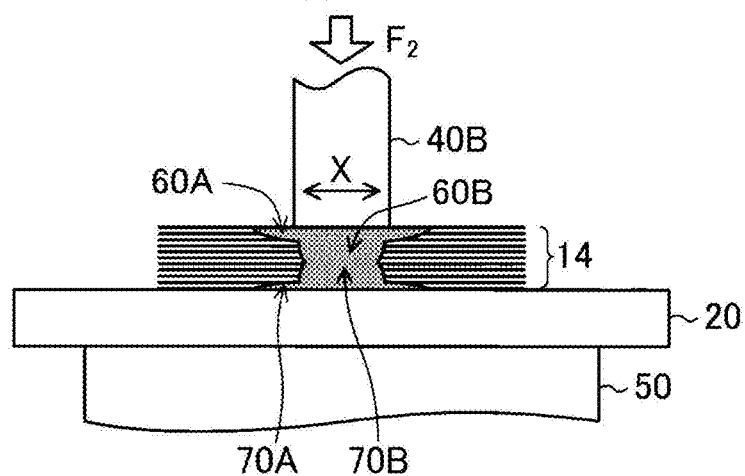

When the ultrasonic vibrations are transmitted to the second horn 40B, vibrational energy is given to the first joint 60A that is gripped by the second horn 40B in tune with the second horn 40B. This produces a frictional force between the first joint 60A and the positive-electrode metal foil 14 located right below, and the first joint 60A and the positive-electrode metal foil 14 are solid-state-joined to each other. The vibrational energy is successively transmitted to the lower positive-electrode metal foils 14, and some of the positive-electrode metal foils 14 are solid-state-joined to each other to form a solid-state joint (second joint) 60B. Similarly, some of the positive-electrode metal foils 14 near the positive-electrode lead 20 are solid-state-joined to each other to form a solid-state joint 70B. As illustrated in FIG. 6B, the second joints 60B and 70B, collectively referred to as an intermediate joint, formed by solid-state-joining metal foils of the positive-electrode metal foils 14 to each other between the first joint 60A and the joint 70A in the stacking direction, are expanded in the vertical direction, and all of the positive-electrode metal foils 14 and the positive-electrode lead 20 are finally solid-state-joined to each other (second joining step).

The second joining step is performed within a joined region that is joined at the first joining step. That is, when the ultrasonic vibrations are transmitted at the second joining step, a circumferential portion of the second horn 40B on which a stress tends to concentrate is located within the first joint 60A that is formed at the first joining step. For this reason, the positive-electrode metal foils 14 below the first joint 60A are connected to the second horn 40B with the first joint 60A interposed therebetween. Accordingly, the stress can be prevented from concentrating on the circumferential portion of the second horn 40B. Consequently, the positive-electrode metal foils 14 below the first joint 60A are not broken but are solid-state-joined through the positive-electrode metal foils 14. That is, the first joint 60A that is formed at the first joining step achieves the same effects as those of the metal plate 100 (see FIG. 4A) disclosed in Patent Document 1 in a pseudo manner.

Figure 6C:
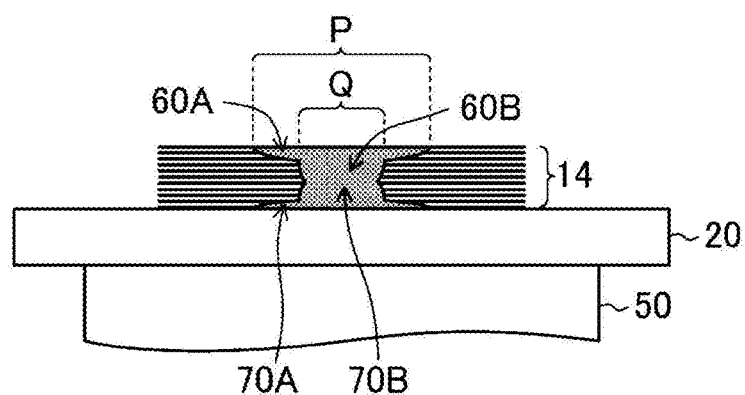

According to the present embodiment, as illustrated in FIG. 6C, the joints of the stacked positive-electrode metal foils 14 and the positive-electrode lead 20 are formed such that a region Q of the second joint 60B that is formed by solid-state-joining all of the stacked positive-electrode metal foils 14 and the positive-electrode lead 20 to each other is within a region P of the first joint 60A that is formed by solid-state-joining some of the positive-electrode metal foils 14 to each other.

As described above, the method according to the present embodiment is a method of manufacturing the secondary battery including the tab that is composed of the stacked metal foils 14 (16) extending from the electrode body 13 and that is connected to the external terminal 15 (17) with the lead 20 (30) interposed therebetween. The method includes a step of preparing the electrode body 13 and a step of ultrasonic-joining the stacked metal foils 14 (16) and the lead 20 (30) to each other. The ultrasonic joining step is performed by transmitting the ultrasonic vibrations to the horn with the stacked metal foils 14 (16) and the lead 20 (30) being interposed between the horn and the anvil and pressed.

The ultrasonic joining step includes the first joining step of solid-state-joining at least some metal foils 14 (16) of the stacked metal foils 14 (16) that are located near the horn to each other, and the second joining step of solid-state-joining all of the stacked metal foils 14 (16) and the lead 20 (30) to each other after the first joining step. The second joining step is performed within the joined region that is joined at the first joining step.

This enables the metal foils 14 (16) to be inhibited from being damaged when the stacked metal foils 14 (16) and the lead 20 (30) are ultrasonic-joined to each other. Consequently, a high-quality secondary battery can be provided.

The secondary battery according to the present embodiment includes the tab that is composed of the stacked metal foils 14 (16) extending from the electrode body 13 and that is connected to the external terminal 15 (17) with the lead 20 (30) interposed therebetween. The stacked metal foils 14 (16) and the lead 20 (30) are solid-state-joined to each other to form the ultrasonic-joined portion. The ultrasonic-joined portion includes the first joint 60A that is formed by solidstate-joining at least some metal foils 14 (16) of the stacked metal foils 14 (16) to each other, and the second joint 60B that is formed by solid-state-joining all of the stacked metal foils 14 (16) and the lead 20 (30) to each other. The second joint 60B is located within the first joint 60A.

According to the present embodiment, the energy of the ultrasonic vibrations per unit area at the first joining step is preferably smaller than the energy of the ultrasonic vibrations per unit area at the second joining step. The pressing force per unit area against the stacked metal foils 14 (16) and the lead 20 (30) at the first joining step is preferably weaker than the pressing force per unit area against the stacked metal foils 14 (16) and the lead 20 (30) at the second joining step. This more effectively inhibits the metal foils 14 (16) from being damaged when the stacked metal foils 14 (16) and the lead 20(30) are ultrasonic-joined to each other. The conditions of ultrasonic-joining at the first joining step and the second joining step may be set in a manner in which the energy of the ultrasonic vibrations per unit area and the pressing force per unit area against the metal foils 14 (16) and the lead 20 (30) are appropriately combined.

According to the present embodiment, at the first joining step, the first joint 60A that is located near the first horn 40A preferably has a thickness adjusted to such an extent that the first joint 60A is not broken during ultrasonic joining. For example, the thickness of the first joint 60A is preferably at least 1/10 of the total thickness of all of the stacked metal foils.

Figure 7A:
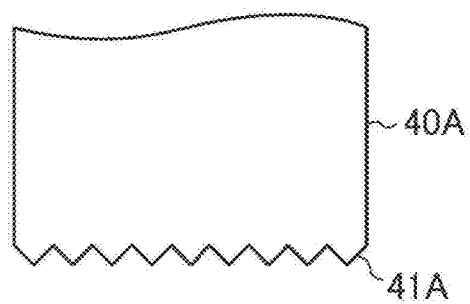
FIG. 7A and FIG. 7B illustrate the shape of horns.
Figure 7B:
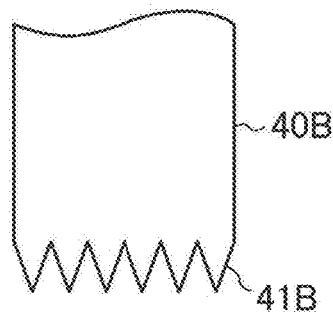

To increase the degree of grip of the metal foils 14 (16), the projections (projecting portions) are preferably formed on the surface of the first horn 40A and the surface of the second horn 40B. In this case, as illustrated in FIG. 7A and FIG. 7B, the height of projecting portions 41A of the first horn 40A at the first joining step is preferably less than the height of projecting portions 41B of the second horn 40B at the second joining step. This enables a gripping force against the metal foils 14 (16) at the first joining step to be weaker than a gripping force against the metal foils 14 (16) at the second joining step. The decrease in the gripping force against the metal foils 14 (16) decreases a stress that concentrates on the portion of the metal foil 14 (16) in contact with the circumferential portion of the first horn 40A. For this reason, at the first joining step, the metal foils 14 (16) can be more effectively inhibited from being broken.

Figure 8:
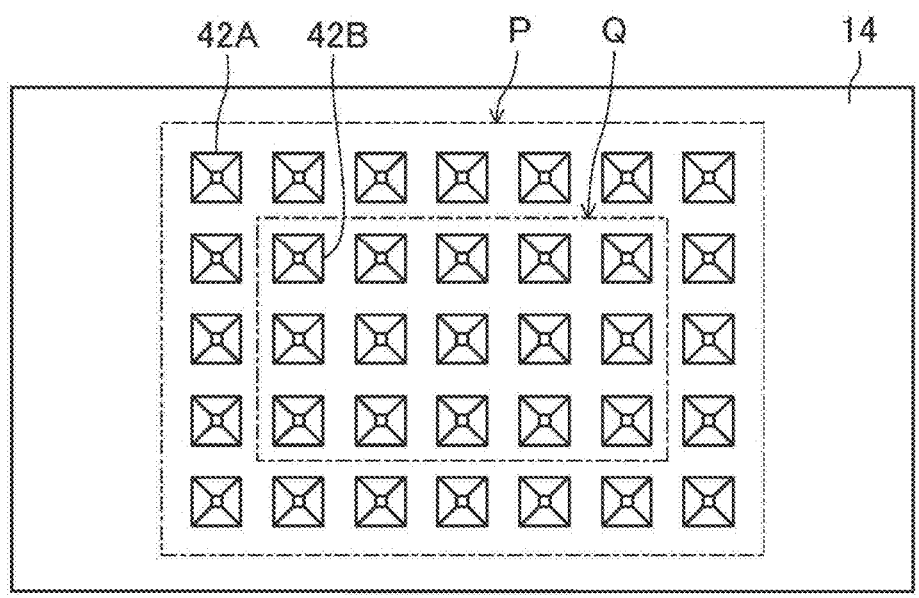
FIG. 8 is a plan view of FIG. 6C in front of an outermost metal foil.

FIG. 8 is a plan view of FIG. 6C in front of the outermost metal foil 14. An illustration of the lead 20(30) is omitted.

As illustrated in FIG. 8, recessed portions 42A are formed on a surface of the first joint 60A (region P), and recessed portions 42B are formed on a surface of the second joint 60B (region Q). The recessed portions 42A and 42B are formed when the projecting portions 41A and 41B of the horns 40A and 40B illustrated in FIG. 7A and FIG. 7B press a surface of the positive-electrode metal foil 14 during ultrasonic joining. For this reason, the depth of the recessed portions 42A of the first joint 60A is less than the depth of the recessed portions 42B of the second joint 60B.

In an example described according to the present embodiment, the positive-electrode sheet and the negative-electrode sheet are wound with the separator interposed therebetween to form the electrode body 13. However, the positive-electrode sheet and the negative-electrode sheet may be stacked with the separator interposed therebetween to form the electrode body. In this case, the metal foils 14 (16) that extend from the end portion of the positive-electrode sheet and the end portion of the negative-electrode sheet may be in the form of strips.

According to the present embodiment, the winding axis of the electrode body 13 is parallel to the bottom of the battery case 11. However, the electrode body 13 may be disposed such that the winding axis is perpendicular to the bottom of the battery case 11.

Known materials may be used for the metal foils 14 (16), the lead 20 (30), the active material layer, the separator, a non-aqueous electrolyte of a positive electrode and a negative electrode, and so on.

Modification

FIG. 9A to FIG. 9C and FIG. 10A to FIG. 10C illustrate a method of joining the stacked positive-electrode metal foils 14 and the positive-electrode lead 20 to each other by ultrasonic joining according to a modification to the embodiment. A method of joining the stacked negative-electrode metal foils 16 and the negative electrode lead 30 to each other by ultrasonic joining is performed in the same manner, and a description thereof is omitted.

According to the present modification, after the stacked positive-electrode metal foils 14 are ultrasonic-joined to each other, all of the joined positive-electrode metal foils 14 and the positive-electrode lead 20 are ultrasonic-joined to each other. The other features are the same as those according to the above embodiment, and a description thereof is omitted.

Figure 9A:
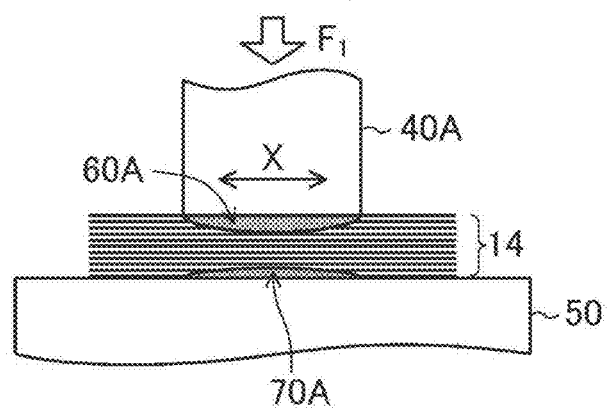
FIG. 9A to FIG. 9C illustrate a method of joining the stacked positive-electrode metal foils and the positive-electrode lead to each other by ultrasonic joining according to a modification to the embodiment.

As illustrated in FIG. 9A, the stacked positive-electrode metal foils 14 are interposed between the first horn 40A and the anvil 50, ultrasonic vibrations are transmitted to the first horn 40A in the direction X parallel to the flat surfaces of the positive-electrode metal foils 14 with the first horn 40A pressed with the pressing force $F_1$ in the direction of an arrow.

When the ultrasonic vibrations are transmitted to the first horn 40A, vibrational energy is given to the outermost positive-electrode metal foil 14 that is gripped by the first horn 40A in tune with the first horn 40A. This produces a frictional force between the outermost positive-electrode metal foil 14 and the positive-electrode metal foil 14 located right below, and the positive-electrode metal foils 14 are solid-state-joined to each other. The vibrational energy is successively transmitted to the lower positive-electrode metal foils 14, and at least some of the positive-electrode metal foils 14 that are located near the first horn 40A are solid-state-joined to each other (first joining step). Consequently, the first joint 60A is formed through the positive-electrode metal foils 14.

A frictional force is produced also between the anvil 50 and the positive-electrode metal foil 14 in contact with the anvil 50. Accordingly, the joint 70A is formed through some of the positive-electrode metal foils 14 starting from the positive-electrode metal foil 14 in contact with the anvil 50.

At the first joining step, ultrasonic joining is performed in conditions in which the outermost positive-electrode metal foil 14 in contact with the first horn 40A is not broken. Specifically, the energy (frequency and/or amplitude) of the ultrasonic vibrations that are transmitted to the first horn 40A per unit area is set such that the positive-electrode metal foil 14 is not broken.

As the conditions of ultrasonic-joining performed at the first joining step, the pressing force that is transmitted to the first horn 40A per unit area may be set such that the positive-electrode metal foil 14 is not broken.

Figure 9B:
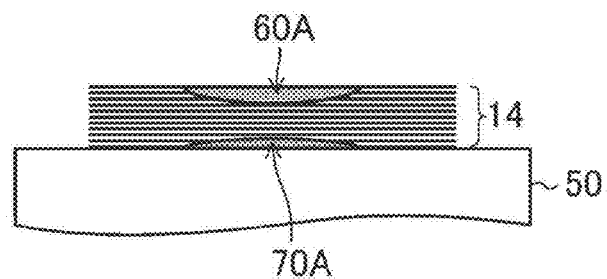

FIG. 9B illustrates a state in which the first horn 40A is removed after the first joining step. As illustrated in FIG. 9B, near a position from which the first horn 40A is removed, some of the positive-electrode metal foils 14 are solid-state-joined to each other to form the first joint 60A. The first joint 60A has a thickness equal to the total thickness of the some of the positive-electrode metal foils 14 and increases in strength.

Figure 9C:
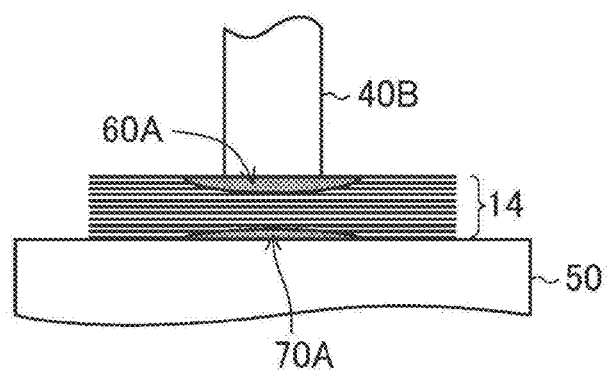

Subsequently, as illustrated in FIG. 9C, the stacked positive-electrode metal foils 14 are interposed between the second horn 40B and the anvil 50. The second horn 40B has a width less than the width of the first horn 40A and is disposed within the first joint 60A that is formed at the first joining step.

Figure 10A:
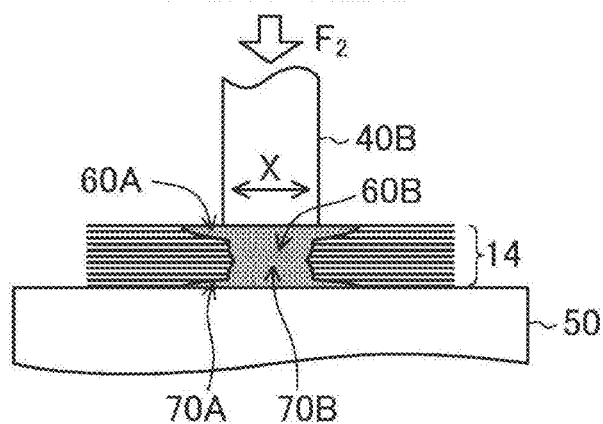
FIG. 10A to FIG. 10C illustrate the method of joining the stacked positive-electrode metal foils and the positive-electrode lead to each other by ultrasonic joining according to the modification to the embodiment.

Subsequently, as illustrated in FIG. 10A, ultrasonic vibrations are transmitted to the second horn 40B in the direction X parallel to the flat surfaces of the positive-electrode metal foils 14 with the second horn 40B pressed with the pressing force $F_2$ in the direction of an arrow.

When the ultrasonic vibrations are transmitted to the second horn 40B, vibrational energy is given to the first joint 60A that is gripped by the second horn 40B in tune with the second horn 40B. This produces a frictional force between the first joint 60A and the positive-electrode metal foil 14 located right below, and the first joint 60A and the positive-electrode metal foil 14 are solid-state-joined to each other. The vibrational energy is successively transmitted to the lower positive-electrode metal foils 14, and some of the positive-electrode metal foils 14 are solid-state-joined to each other to form the second joint 60B. Similarly, some of the positive-electrode metal foils 14 near the anvil 50 are solid-state-joined to each other to form the joint 70B. The second joints 60B and 70B are expanded in the vertical direction, and all of the positive-electrode metal foils 14 are finally solid-state-joined to each other (second joining step).

The second joining step is performed within the joined region that is joined at the first joining step. That is, when the ultrasonic vibrations are transmitted at the second joining step, the circumferential portion of the second horn 40B on which a stress tends to concentrate is located within the first joint 60A that is formed at the first joining step. For this reason, the positive-electrode metal foils 14 below the first joint 60A are connected to the second horn 40B with the first joint 60A interposed therebetween. For this reason, the stress can be prevented from concentrating on the circumferential portion of the second horn 40B. Consequently, the positive-electrode metal foils 14 below the first joint 60A are not broken but are solid-state-joined to each other through the positive-electrode metal foils 14. That is, the first joint 60A that is formed at the first joining step achieves the same effects as those of the metal plate 100 (see FIG. 4A) disclosed in Patent Document 1 in a pseudo manner.

Figure 10B:
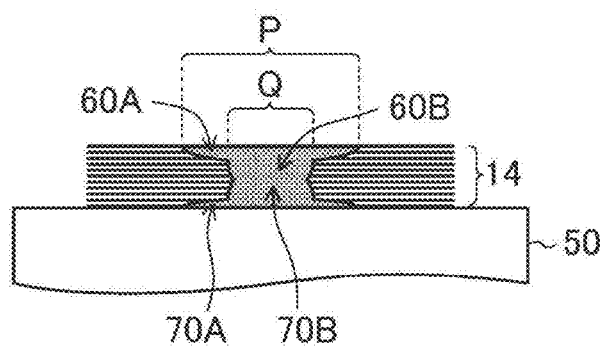

According to the present modification, as illustrated in FIG. 10B, the joints of the stacked positive-electrode metal foils 14 are formed such that the region Q of the second joint 60B that is formed by solid-state-joining all of the stacked positive-electrode metal foils 14 to each other is within the region P of the first joint 60A that is formed by solid-state-joining some of the positive-electrode metal foils 14 to each other.

Figure 10C:
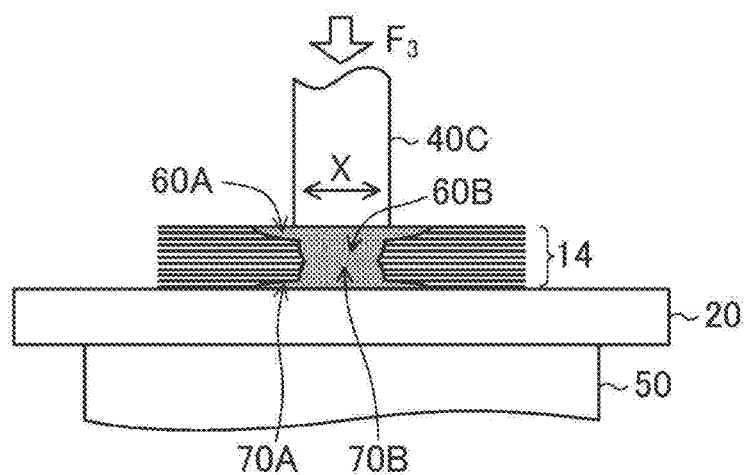

Subsequently, as illustrated in FIG. 10C, the joined positive-electrode metal foils 14 and the positive-electrode lead 20 are interposed between a third horn 40C and the anvil 50. Ultrasonic vibrations are transmitted to the third horn 40C in the direction X parallel to the flat surfaces of the positive-electrode metal foils 14 with the third horn 40C pressed with a pressing force $F_3$ in the direction of an arrow. Consequently, the joined positive-electrode metal foils 14 and the positive-electrode lead 20 are ultrasonic-joined to each other.

The third horn 40C needs only to have a thickness less than the thickness of the first horn 40A and to be disposed within the first joint 60A that is formed at the first joining step.

The method according to the present modification is a method of manufacturing the secondary battery including the tab that is composed of the stacked metal foils 14 (16) extending from the electrode body 13 and that is connected to the external terminal 15 (17) with the lead 20 (30) interposed therebetween. The method includes a step A of preparing the electrode body 13, a step B of ultrasonic-joining the stacked metal foils 14 (16) to each other, and a step C of ultrasonic-joining all of the joined metal foils 14 (16) and the lead 20 (30) to each other after the step B.

The step B is performed by transmitting the ultrasonic vibrations to the horn with the stacked metal foils 14 (16) being interposed between the horn and the anvil and pressed. The step B includes the first joining step of solid-state-joining at least some metal foils 14 (16) of the stacked metal foils 14 (16) that are located near the horn to each other, and the second joining step of solid-state-joining all of the stacked metal foils 14 (16) to each other after the first joining step. The second joining step is performed within the joined region that is joined at the first joining step.

This enables the metal foils 14 (16) to be inhibited from being damaged when the stacked metal foils 14 (16) and the lead 20 (30) are ultrasonic-joined to each other. Consequently, a high-quality secondary battery can be provided.

The secondary battery according to the present modification includes the tab that is composed of the stacked metal foils 14 (16) extending from the electrode body 13 and that is connected to the external terminal 15 (17) with the lead 20 (30) interposed therebetween. The stacked metal foils 14 (16) and the lead 20 (30) are solid-state-joined to each other to form the ultrasonic-joined portion. The ultrasonic-joined portion includes the first joint 60A that is formed by solid-state-joining at least some metal foils 14 (16) of the stacked metal foils 14 (16) to each other, and the second joint 60B that is formed by solid-state-joining all of the stacked metal foils 14 (16) to each other. The second joint 60B is located within the first joint 60A.

The present invention is described above with the preferred embodiment. The description is not restrictive, and various modifications can be naturally made. For example, the present invention can be used for an electricity storage element (for example, a capacitor) that includes an electrode body and a lead that each have the same structure, although in an example described according to the above embodiment, the secondary battery includes the tab that is composed of the stacked metal foils 14 (16) extending from the electrode body 13 and that is connected to the external terminal 15 (17) with the lead 20 (30) interposed therebetween.

The present invention can also be used for a joining method of joining the stacked metal foils. That is, the stacked metal foils are joined to each other by ultrasonic joining in a manner in which the ultrasonic vibrations are transmitted to the horn with the stacked metal foils being interposed between the horn and the anvil and pressed. The ultrasonic joining includes the first joining step of solid-state-joining at least some metal foils of the stacked metal foils that are located near the horn to each other, and the second joining step of solid-state-joining all of the stacked metal foils to each other after the first joining step. The second joining step is performed within the joined region that is joined at the first joining step.

A joint assembly that is thus solid-state-joined by ultrasonic joining includes the first joint that is formed by solid-state-joining at least some metal foils of the stacked metal foils to each other, and the second joint that is formed by solid-state-joining all of the stacked metal foils to each other. The second joint is located within the first joint.

The present invention can also be used for a method of joining the stacked metal foils and the metal plate. That is, the method includes the step A of ultrasonic-joining the stacked metal foils to each other, and the step B of ultrasonic-joining all of the joined metal foils and the metal plate to each other after the step A. The step A is performed by transmitting the ultrasonic vibrations to the horn with the stacked metal foils being interposed between the horn and the anvil and pressed. The step A includes the first joining step of solid-state-joining at least some metal foils of the stacked metal foils that are located near the horn to each other, and the second joining step of solid-state-joining all of the stacked metal foils to each other after the first joining step. The second joining step is performed within the joined region that is joined at the first joining step.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An electricity storage element comprising:
   a tab that is composed of stacked metal foils extending from an electrode body and that is connected to an external terminal with a lead interposed therebetween,
   wherein the stacked metal foils and the lead are solid-state-joined to each other to form an ultrasonic-joined portion,
   wherein the ultrasonic-joined portion includes:
   a first joint that is formed by solid-state-joining at least some metal foils of the stacked metal foils to each other, the first joint including:
   a first-side first joint extending from a first surface at a first end in a stacking direction of the stacked metal foils, the first surface being free of direct contact with the lead, wherein the first-side first joint is formed by solid-state-joining at least some metal foils of the stacked metal foils to each other adjacent to the first surface, and
   a second-side first joint extending from a second surface at a second end, opposite the first end, in the stacking direction of the stacked metal foils, the second surface being in direct contact with the lead, wherein the second-side first joint is formed by solid-state-joining at least some metal foils of the stacked metal foils to each other adjacent to the second surface; and
   a second joint that is formed by solid-state-joining all of the stacked metal foils and the lead to each other, wherein the second joint includes an intermediate joint formed by solid-state-joining metal foils of the stacked metal foils to each other between the first-side first joint and the second-side first joint in the stacking direction, such that the first-side first joint and the second-side first joint are connected with each other via the intermediate joint therebetween, and
   wherein a perimeter of the intermediate joint in a cross section taken along a plane perpendicular to the stacking direction is inside of a perimeter of the first-side first joint at the first surface viewed in the stacking direction,
   wherein recessed portions are formed on a surface of the first joint and a surface of the second joint, and
   wherein a depth of each of the recessed portions outside the perimeter of the intermediate joint is less than a depth of each of the recessed portions inside the perimeter of the intermediate joint.

2. The electricity storage element according to claim 1, wherein the electricity storage element includes a secondary battery.

* * * * *